(12) United States Patent
Todokoro

(10) Patent No.: US 9,176,322 B2
(45) Date of Patent: Nov. 3, 2015

(54) LIGHT SCANNING DEVICE REDUCING DEFORMATION OF Fθ THETA LENS AND HOUSING AND IMAGE FORMING APPARATUS WITH THE SAME

(71) Applicant: Kyocera Document Solutions Inc., Osaka (JP)

(72) Inventor: Ryoutarou Todokoro, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/499,176

(22) Filed: Sep. 27, 2014

(65) Prior Publication Data

US 2015/0092002 A1    Apr. 2, 2015

(30) Foreign Application Priority Data

Sep. 27, 2013   (JP) ................................ 2013-200670

(51) Int. Cl.
| | |
|---|---|
| B41J 2/435 | (2006.01) |
| B41J 27/00 | (2006.01) |
| G02B 26/12 | (2006.01) |
| G02B 7/02 | (2006.01) |
| G02B 13/00 | (2006.01) |

(52) U.S. Cl.
CPC .............. G02B 26/125 (2013.01); G02B 7/028 (2013.01); G02B 26/127 (2013.01); G02B 13/0005 (2013.01)

(58) Field of Classification Search
USPC .................. 347/231, 241–245, 256–261, 263
See application file for complete search history.

(56) References Cited

U.S. PATENT DOCUMENTS

| | | | | |
|---|---|---|---|---|
| 5,581,391 | A * | 12/1996 | Uzuki et al. ................ | 359/205.1 |
| 5,793,408 | A * | 8/1998 | Nakajima ..................... | 347/259 |
| 2013/0215478 | A1* | 8/2013 | Mizutani et al. .............. | 358/474 |

FOREIGN PATENT DOCUMENTS

JP    H05-203889 A    8/1993

* cited by examiner

*Primary Examiner* — Hai C Pham
(74) *Attorney, Agent, or Firm* — James W. Judge

(57) ABSTRACT

A light scanning device include a housing and an fθ lens. The housing includes a bottom plate and a sidewall disposed upright at the bottom plate. The rotating polyhedron and the fθ lens are each installed at the bottom plate of the housing. The rotating polyhedron is configured to deflect and scan light beam. Light beam deflected and scanned by the rotating polyhedron transmits the fθ lens. The bottom plate of the housing includes a stepped portion at a part corresponding to a peripheral area of the fθ lens. The stepped portion is formed lower than a top surface of the bottom plate. The stepped portion has a ridge line in a concavo-convex shape.

5 Claims, 6 Drawing Sheets

LIGHT SCANNING DEVICE REDUCING DEFORMATION OF Fθ THETA LENS AND HOUSING AND IMAGE FORMING APPARATUS WITH THE SAME

CROSS-REFERENCE TO RELATED APPLICATION

This application is based upon, and claims the benefit of priority from, corresponding Japanese Patent Application No. 2013-200670 filed in the Japan Patent Office on Sep. 27, 2013, the entire contents of which are incorporated herein by reference.

BACKGROUND

Unless otherwise indicated herein, the description in this section is not prior art to the claims in this application and is not admitted to be prior art by inclusion in this section.

A light scanning device located at an image forming apparatus such as a copier and a printer houses a rotating polyhedron and an fθ lens. With this light scanning device, heat generation of the rotating polyhedron causes a problem of deformation of the fθ lens. That is, heat generation of the rotating polyhedron deforms a housing in which the fθ lens is located, resulting in deformation of the fθ lens. As a result, optical performance of the fθ lens is changed. To solve the problem, a typical light scanning device secures an fθ lens to a housing with a jig, thus reducing deformation of the fθ lens.

SUMMARY

A light scanning device according to an aspect of the disclosure includes a housing, a rotating polyhedron, and an fθ lens. The housing includes a bottom plate, and a sidewall disposed upright at the bottom plate. The rotating polyhedron and the fθ lens are each installed at the bottom plate of the housing. The rotating polyhedron is configured to deflect and scan light beam. Light beam deflected and scanned by the rotating polyhedron passes through the fθ lens. The bottom plate of the housing includes a stepped portion at a part corresponding to a peripheral area of the fθ lens. The stepped portion is formed lower than a top surface of the bottom plate. The stepped portion has a ridge line in a concavo-convex shape.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
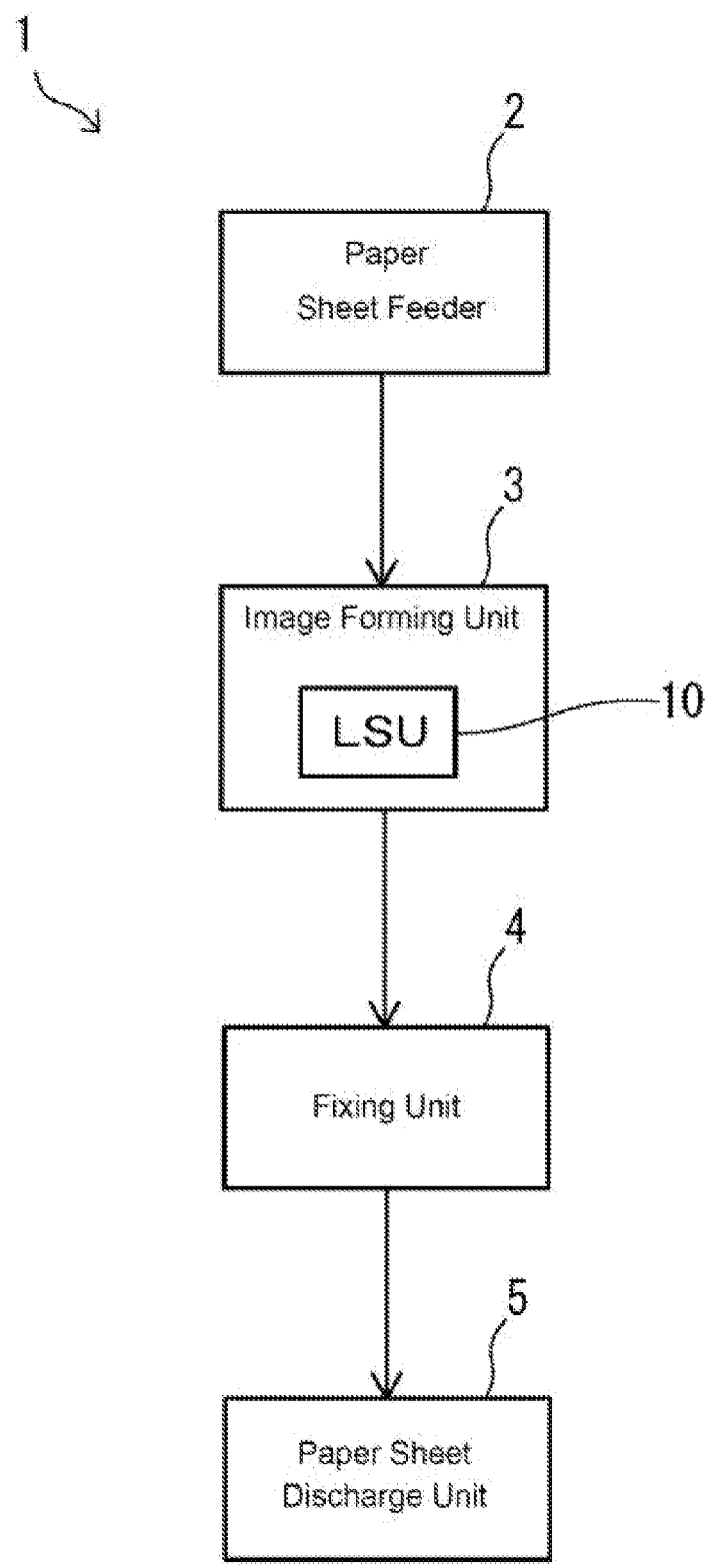
FIG. 1 schematically illustrates a configuration of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereafter, a description will be given of embodiments of the disclosure in detail with reference to the drawings. The disclosure will not be limited to the embodiments described below.

An image forming apparatus 1 of this embodiment is, for example, a laser printer and a multi-functional peripheral. The image forming apparatus 1 is constituted so as to form images on paper sheets based on image data transmitted from a terminal or a similar device (not illustrated) while conveying the paper sheets. As illustrated in FIG. 1, the image forming apparatus 1 includes a paper sheet feeder 2, an image forming unit 3, a fixing unit 4, and a paper sheet discharge unit 5.

The paper sheet feeder 2 is a cassette paper sheet feeder and a bypass tray to supply the paper sheets to the image forming unit 3. Although not illustrated, the image forming unit 3 includes a photoreceptor drum, a charger arranged at a peripheral area of the photoreceptor drum, a developing unit, a transfer roller, or a similar device. The image forming unit 3 includes a laser scanning unit (LSU) 10 as a light scanning device. The laser scanning unit 10 emits a light beam to the photoreceptor drum to form an electrostatic latent image. The image forming unit 3 transfers toner images on the paper sheets supplied from the paper sheet feeder 2. Although not illustrated, the fixing unit 4 includes a fixing roller and a pressure roller that rotate while bringing into pressure contact with one another. The fixing unit 4 is configured to fix images (toner images) transferred on the paper sheets by the image forming unit 3 on the paper sheets. The paper sheet discharge unit 5 includes a discharge tray (not illustrated) to which the paper sheets on which images are formed are supplied from the fixing unit 4.

Figure 2:
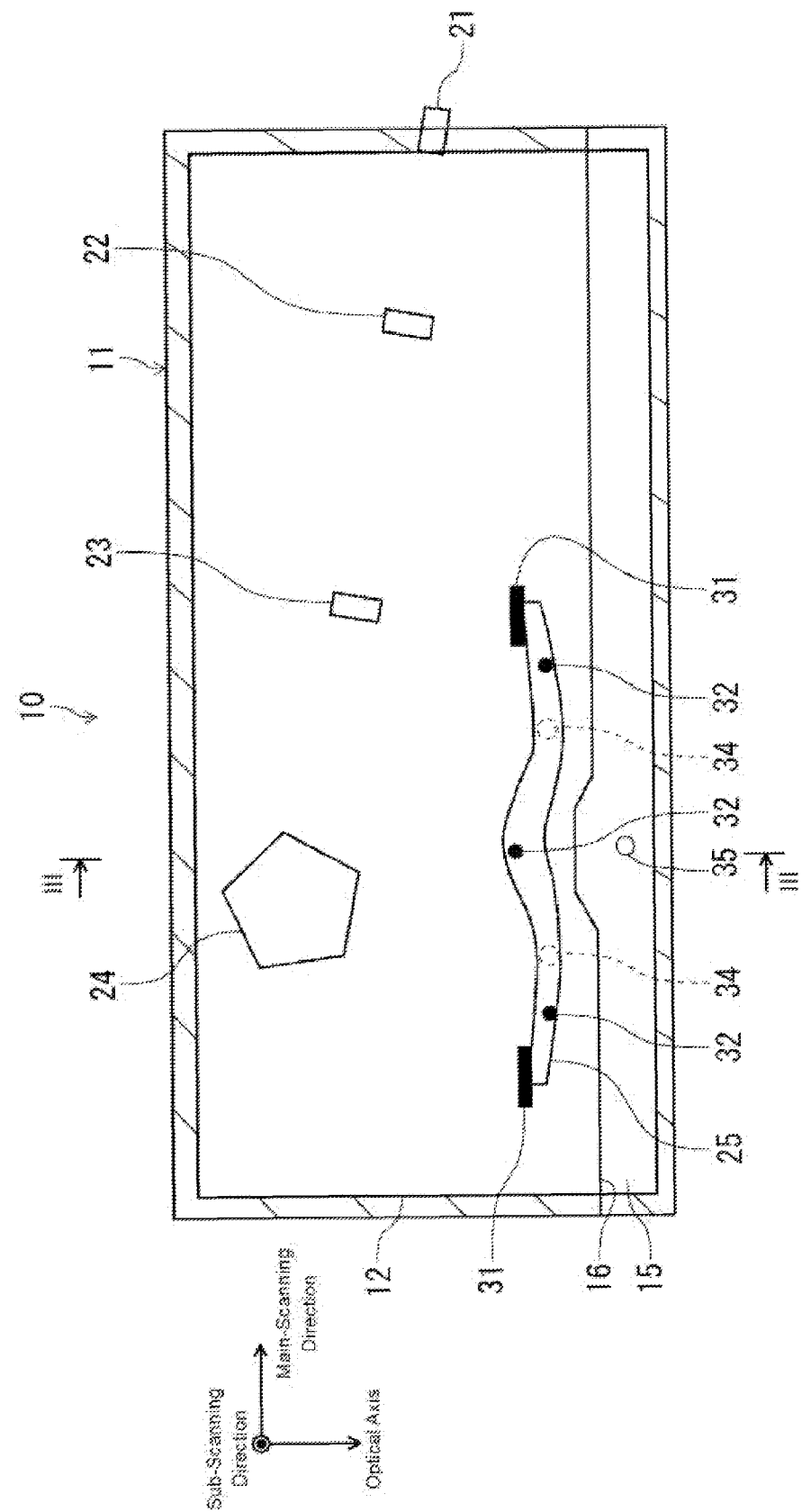
FIG. 2 illustrates a cross section taken along the line II-II of FIG. 3 for an internal constitution of a laser scanning unit according to the one embodiment.
Figure 3:
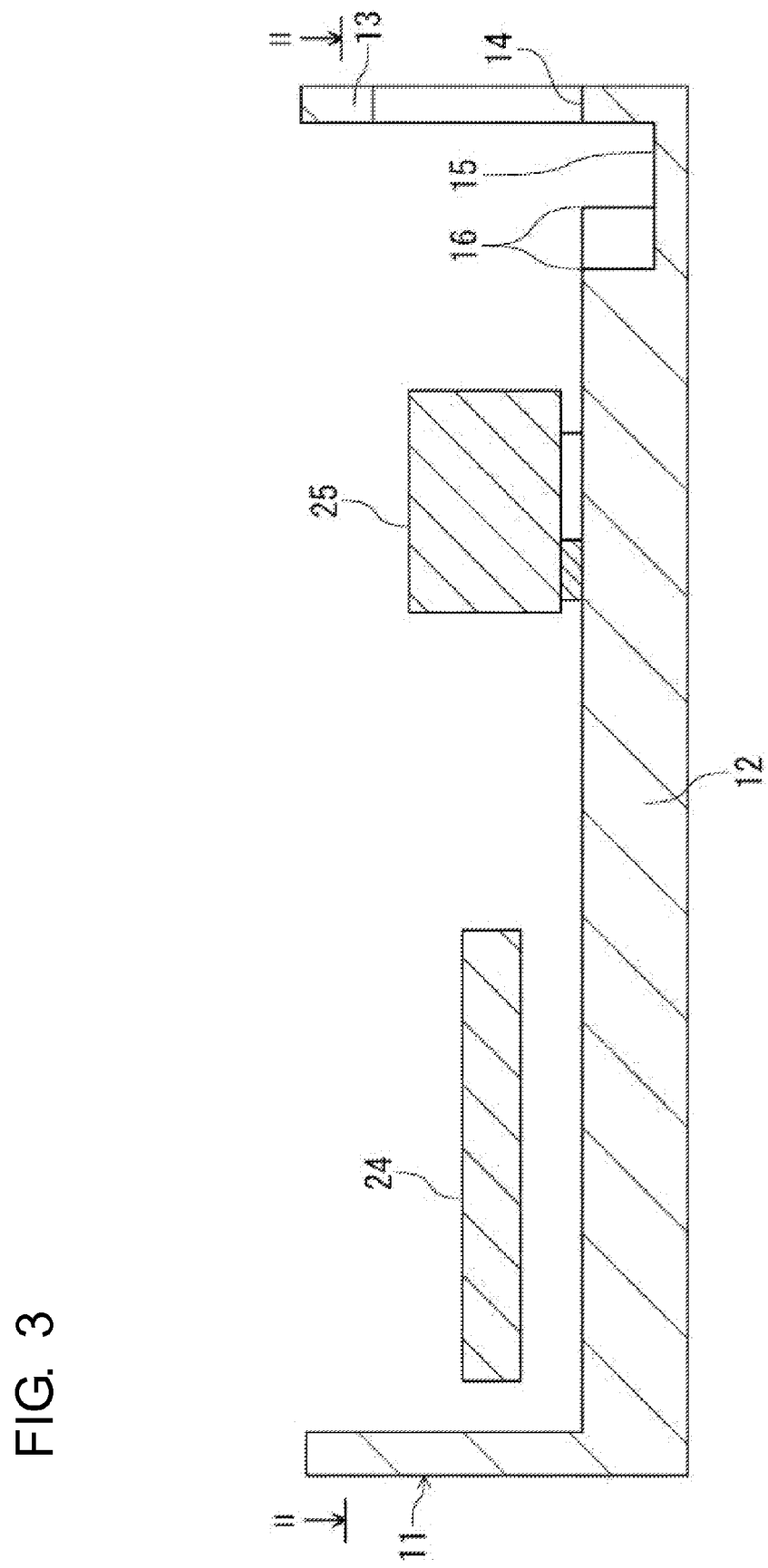
FIG. 3 illustrates a cross section taken along the line III-III of FIG. 2.

As illustrated in FIG. 2 and FIG. 3, the laser scanning unit 10 includes a housing 11. The housing 11 houses light scanning parts, which will be described later. The housing 11 is made of, for example, a resin material whose strength is enhanced with glass fiber. The housing 11 includes a bottom plate 12 and a sidewall 13. The sidewall 13 is disposed upright at the bottom plate 12. Although not illustrated, a lid member closes an open ceiling part of the housing 11.

The housing 11 houses a collimator lens 22, a cylinder lens 23, a rotating polyhedron 24, and an fθ lens 25 (scanning lens), and a similar component as the light scanning parts. These light scanning parts are installed at a top surface of the bottom plate 12 of the housing 11. The housing 11 is provided with a light source 21, which is the light scanning part.

In the laser scanning unit 10, the collimator lens 22 collimates one or a plurality of light beams emitted from the light source 21. Afterwards, the light beams are condensed at the cylinder lens 23. The light beam condensed at the cylinder lens 23 is deflected and scanned at the rotating polyhedron 24. The light beam deflected and scanned at the rotating polyhedron 24 is emitted from an emission port 14, which is formed at the sidewall 13 of the housing 11, to the above-described photoreceptor drum, passing through the fθ lens 25. Thus, the electrostatic latent image is formed at the photoreceptor drum. The rotating polyhedron 24 includes a motor (not illustrated).

At the bottom plate 12 of the housing 11, the rotating polyhedron 24 and the fθ lens 25 are arranged in an order of the optical axis direction. The fθ lens 25 is formed into an approximately bar shape extending in a main-scanning direction perpendicular to the optical axis direction. At the central portion in the main-scanning direction, the fθ lens 25 is concaved toward the rotating polyhedron 24 side. Shortly, the central portion of the fθ lens 25 in the main-scanning direction is concaved with respect to a travelling direction of light beam.

A stepped portion 15 is formed at a part corresponding to the peripheral area of the fθ 4 lens 25 at the bottom plate 12 of the housing 11. The stepped portion 15 is located between a light emission surface of the fθ lens 25 and the side wall 13 (opposite side of a side where the rotating polyhedron 24 is arranged). The bottom surface of the stepped portion 15 is formed lower than the top surface of the bottom plate 12. Specifically, the stepped portion 15 is located near the fθ lens 25 in the bottom plate 12 between the sidewall 13 which includes the emission port 14 and the fθ lens 25. The stepped portion 15 is located at the bottom plate 12 in the main-scanning direction. The stepped portion 15 is located from the proximity of the fθ lens 25 to the sidewall 13 of the bottom plate 12 in the optical axis direction.

Furthermore, a ridge line 16 of the stepped portion 15 has a concavo-convex shape in plan view (see FIG. 2). In detail, the ridge line 16 of the stepped portion 15 has the concavo-convex shape along the shape of the fθ lens 25 in the longitudinal direction (that is, the main-scanning direction). That is, the ridge line 16 of the stepped portion 15 is concaved toward the rotating polyhedron 24 side at a portion corresponding to the central portion in the longitudinal direction of the fθ lens 25. An attachment hole 35 is formed at the bottom surface of the stepped portion 15. A light detector (not illustrated) is removable/attachable from the attachment hole 35. The light detector detects whether or not the light beam that has gone through the fθ lens 25 has passed a predetermined main-scanning direction position and a predetermined sub-scanning direction position. The bottom surface of the stepped portion 15 is formed lower than the top surface of the bottom plate 12. Accordingly, even if a size of the light detector is large, attaching the light detector to the attachment hole 35 allows setting a detection position of the light beam by the light detector at the predetermined main-scanning direction position and the predetermined sub-scanning direction position. This allows the light detector to further reliably detect whether or not the light beam has passed the predetermined main-scanning direction position and the predetermined sub-scanning direction position.

According to the laser scanning unit 10 of this embodiment, the stepped portion 15 is formed at a part corresponding to the peripheral area of the fθ lens 25 at the bottom plate 12 of the housing 11. The bottom surface of the stepped portion 15 is formed lower than the top surface of the bottom plate 12. Since the ridge line 16 of the stepped portion 15 has the concavo-convex shape (shortly, a corner portion of the stepped portion 15 has the concavo-convex shape in plan view), rigidity of the bottom plate 12 at the peripheral area of the fθ lens 25 can be enhanced. That is, rigidity of the bottom plate 12 can be enhanced in the sub-scanning direction.

With the laser scanning unit 10, temperature distribution (temperature gradient) in which the temperature becomes the highest near the rotating polyhedron 24 and the temperature becomes lower as away from the rotating polyhedron 24 is formed. This temperature gradient deforms the bottom plate 12 of the housing 11. Specifically, since the bottom plate 12 has high rigidity near the sidewall 13 but low rigidity near the fθ lens 25, the bottom plate 12 is deformed so as to hunch in the sub-scanning direction. That is, heat generation of the rotating polyhedron 24 applies a load to the bottom plate 12 in the sub-scanning direction. The deformation of the bottom plate 12 deforms the fθ lens 25. In contrast to this, with the housing 11 of this embodiment enhances the rigidity of the bottom plate 12 in the sub-scanning direction as described above. This ensures the reduced deformation of the bottom plate 12 due to heat generation of the rotating polyhedron 24.

Moreover, in this embodiment, the ridge line 16 of the stepped portion 15 has the concavo-convex shape along the shape of the fθ lens 25 in the longitudinal direction (the main-scanning direction). Accordingly, the rigidity of the bottom plate 12 near the fθ lens 25 (rigidity in the sub-scanning direction) can be enhanced with more certainty. Therefore, the deformation of the bottom plate 12 and furthermore the deformation of the fθ lens 25 can be effectively reduced.

Figure 4:
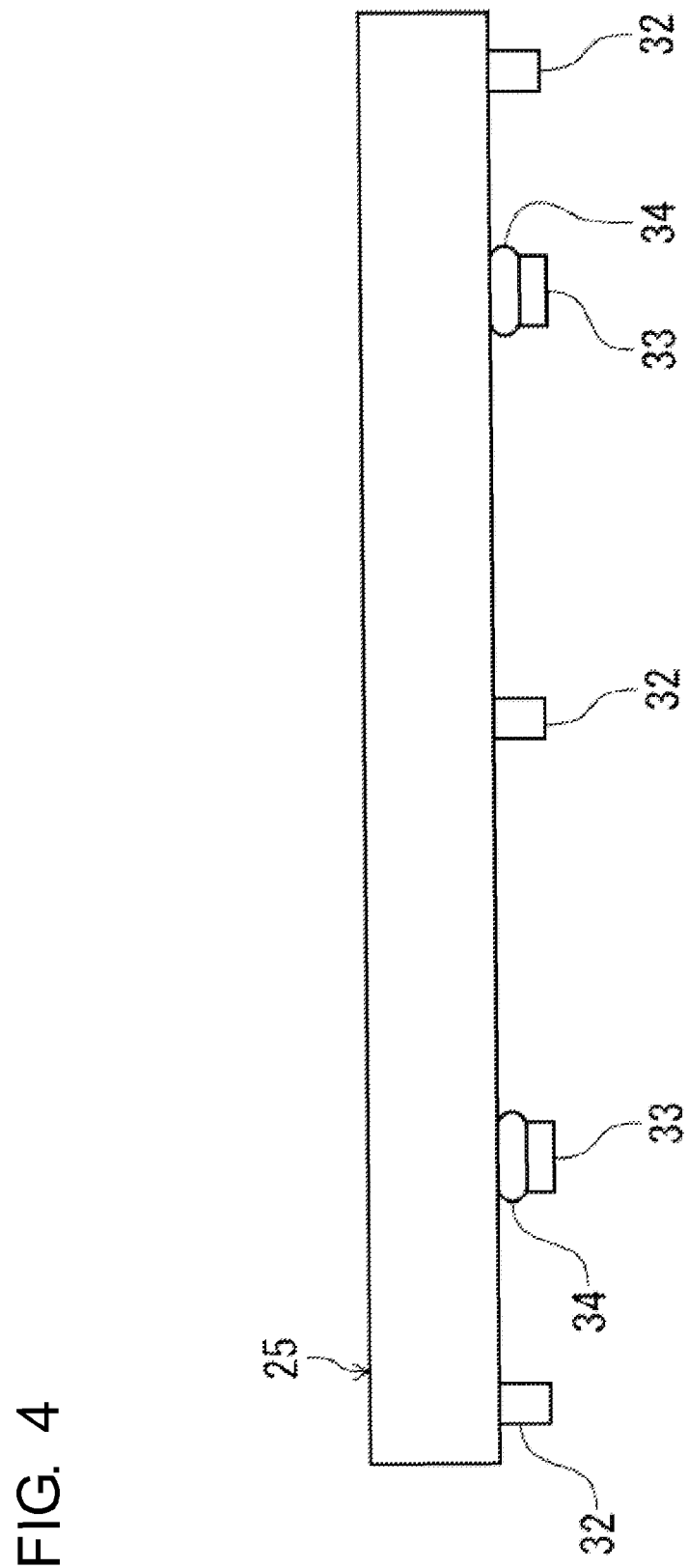
FIG. 4 illustrates an fθ lens according to the one embodiment viewed in an optical axis direction.

A position of the fθ lens 25 is determined in the respective main-scanning direction, sub-scanning direction, and optical axis direction for installation. The position in the main-scanning direction is determined using, for example, an abutting jig. As illustrated in FIG. 2, the position in the optical axis direction is determined by abutting the fθ lens 25 to ribs 31 located corresponding to both ends of the fθ lens 25 in the longitudinal direction. As illustrated in FIG. 4, the position in the sub-scanning direction is determined by placing the fθ lens 25 on first bosses 32 at a predetermined height. The first bosses 32 are located at three positions in total: the center in the longitudinal direction and close to both ends in the longitudinal direction of the fθ lens 25.

The fθ lens 25 whose position is determined as described above is secured with adhesives 34. As illustrated in FIG. 4, the fθ lens 25 is secured at a plurality of positions (two positions in this embodiment) with the adhesives 34. Specifically, second bosses 33 are located at two positions between the first bosses 32 of the bottom plate 12. The second bosses 33 are formed lower than the first bosses 32 and located close to the first bosses 32 positioned at both ends of the fθ lens 25 in the longitudinal direction. The adhesives 34 are applied on the top surfaces of the second bosses 33 to adhesively secure the fθ lens 25.

For example, if an elongated member like the fθ lens 25 is adhesively secured at one position, hardening and shrinking of the adhesive flexes the fθ lens 25. In contrast to this, the fθ lens 25 of this embodiment is adhesively secured at the plurality of positions as described above. This disperses stress caused by the hardening and shrinking of the adhesives 34 between the first bosses 32, ensuring the reduced flexure of the fθ lens 25. Thus, this embodiment ensures the reduced deformation of the fθ lens 25 due to hardening and shrinking at the time when the fθ lens 25 is adhesively secured as well as the deformation due to heat generation of the rotating polyhedron 24.

When the fθ lens 25 is adhesively secured at a plurality of positions, this may cause a problem that adhesion points may be separated due to difference in coefficient of linear expansion between the fθ lens 25 and the housing 11 (the bottom plate 12) during expansion of the bottom plate 12 and the fθ lens 25 due to heat generation of the rotating polyhedron 24. In this respect, with this embodiment, the rigidity of the bottom plate 12 can be enhanced and the deformation of the bottom plate 12 can be reduced as described above. This ensures reducing a situation that the adhesion points of the fθ lens 25 are separated.

Figure 5:
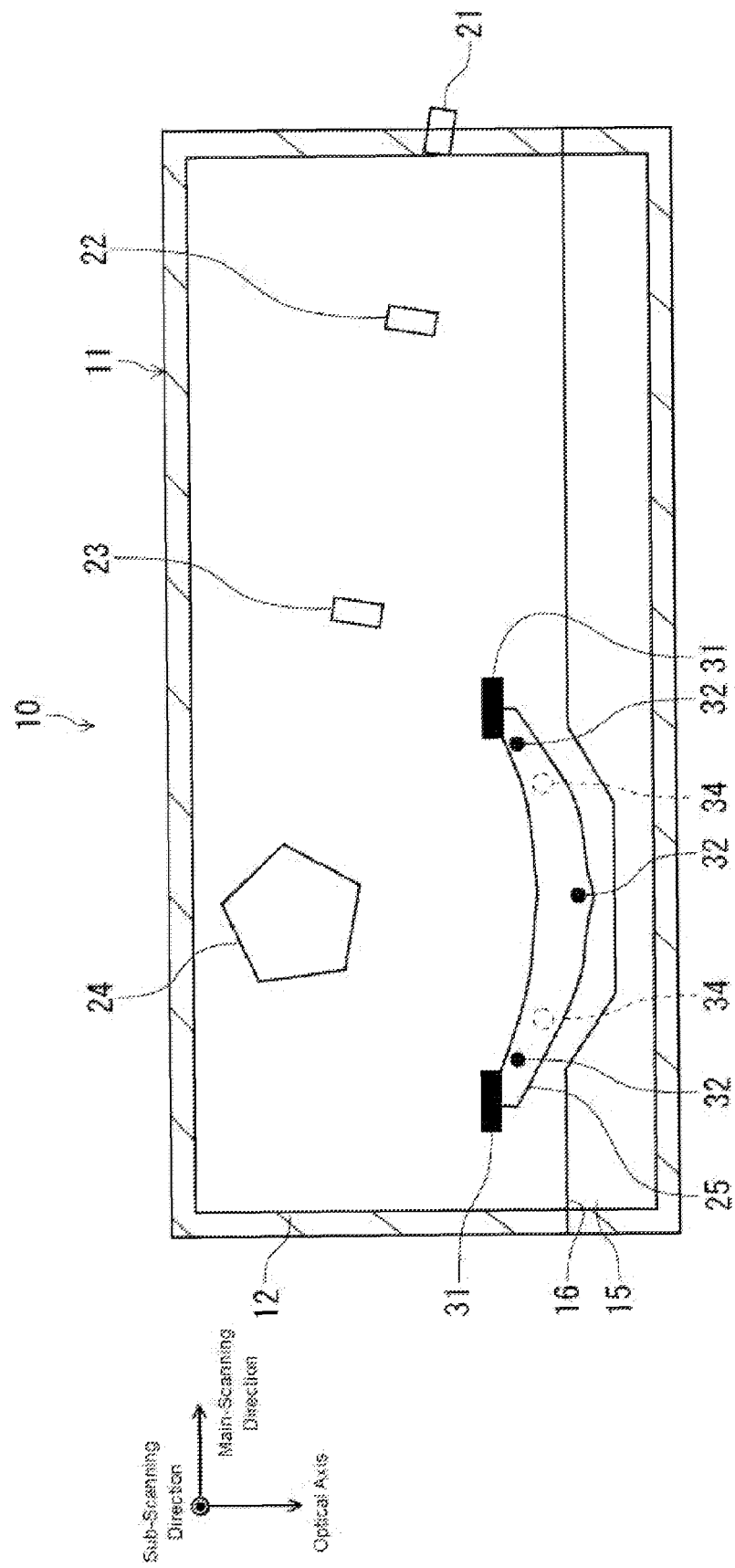
FIG. 5 illustrates a cross section for an internal constitution of a laser scanning unit according to a modification of the one embodiment.

The following describes a modification of the laser scanning unit 10 according to the embodiment. For example, the modification illustrated in FIG. 5 includes a curved fθ lens 25 such that the fθ lens 25 has a convex shape in the travelling direction of the light beam. In this case, the ridge line 16 of the stepped portion 15 projects toward the sidewall 13 side at a portion corresponding to the central portion of the fθ lens 25 in the longitudinal direction. That is, the ridge line 16 of the stepped portion 15 has the concavo-convex shape along the shape of the fθ lens 25 in the longitudinal direction.

Figure 6:
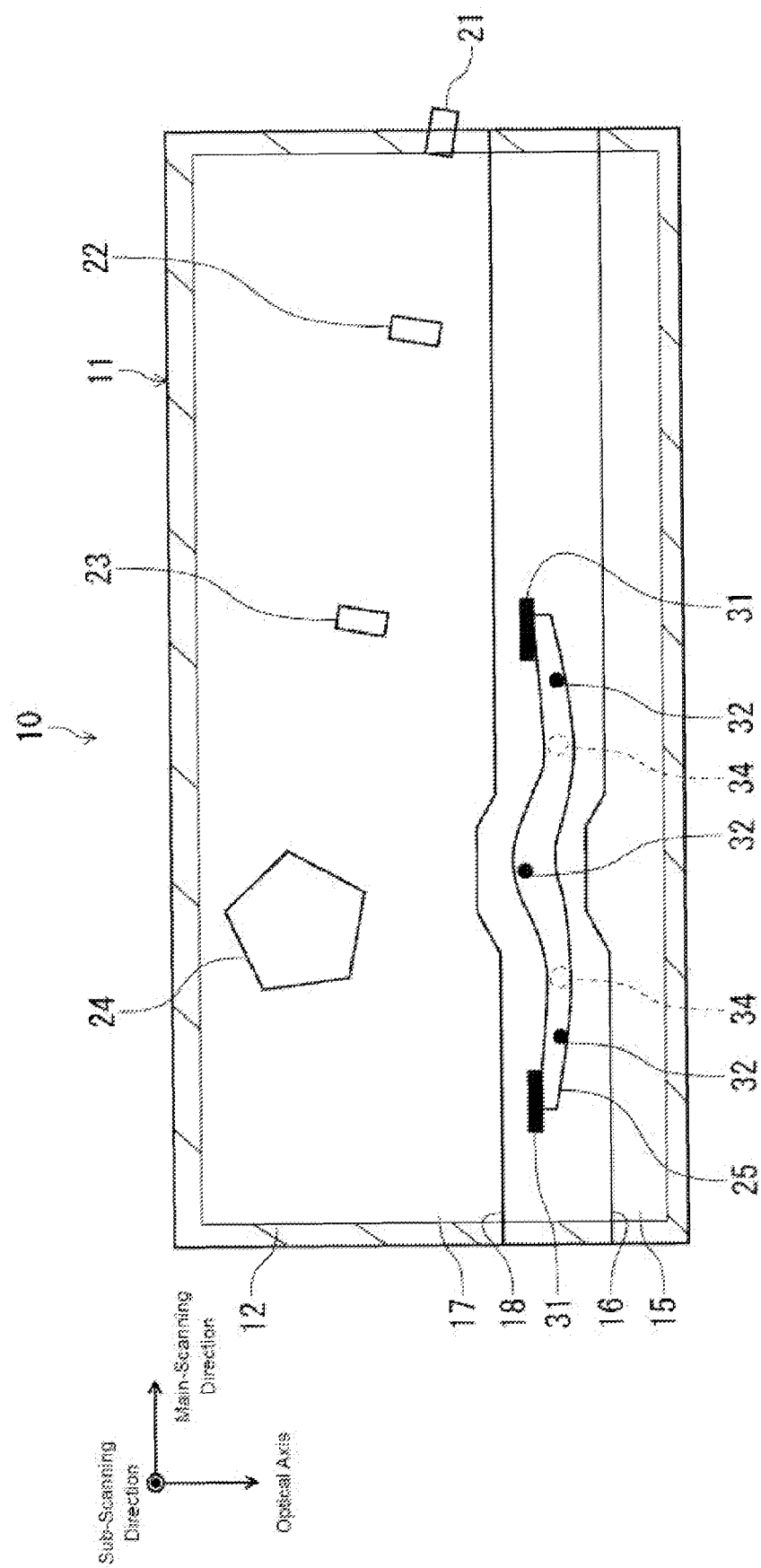
FIG. 6 illustrates a cross section for an internal constitution of a laser scanning unit according to another modification of the one embodiment.

The modification illustrated in FIG. 6 includes stepped portions 15 and 17 at both sides of the bottom plate 12 of the housing 11 in the optical axis direction of the fθ lens 25. That is, the stepped portions 15 and 17 are respectively located at the sidewall 13 side (see FIG. 3) and the rotating polyhedron 24 side of the fθ lens 25. The ridge line 16 of the stepped portion 15 at the sidewall 13 side is, similarly to the embodiment, concaved toward the rotating polyhedron 24 side at the portion corresponding to the central portion of the fθ lens 25 in the longitudinal direction. Meanwhile, a ridge line 18 of a stepped portion 17 at the rotating polyhedron 24 side is also concaved toward the rotating polyhedron 24 side at the portion corresponding to the central portion of the fθ lens 25 in the longitudinal direction. Thus, in this modification as well, the ridge lines 16 and 18 of the stepped portions 15 and 17 have the concavo-convex shape along the shape of the fθ lens 25 in the longitudinal direction. In these modifications, the operations and effects similar to the above-described embodiment can also be achieved.

While the embodiment includes the stepped portion 15 at the sidewall 13 side of the fθ lens 25, instead of this configuration, a stepped portion may be located at the rotating polyhedron 24 side of the fθ lens 25.

While the embodiment adhesively secures the fθ lens 25 at the plurality of positions, the fθ lens 25 may be adhesively secured at one position.

The image forming apparatus of the embodiment may be, for example, a copier, a scanner device, or a similar device as well as a laser printer and a multi-functional peripheral.

As described above, the disclosure is effective to a light scanning device used for an image forming apparatus such as a copier and a printer and to an image forming apparatus that includes the light scanning device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A light scanning device scanning in a main scanning direction defining a longitudinal orientation, the light scanning device comprising:
    a housing that includes a bottom plate and a sidewall disposed upright on the bottom plate;
    a rotating polyhedral light-beam deflector/scanner installed on a top surface of the housing bottom plate; and
    an fθ lens installed on the top surface of the housing bottom plate in a position where light beams from the rotating polyhedral deflector/scanner pass through the fθ lens, a longitudinally central portion of the fθ lens being concave such as to curve toward the polyhedral deflector/scanner; wherein
    a longitudinally extending portion of the top surface of the housing bottom plate is recessed with a stepped part along an opposite side of the fθ lens from the lens' concave side, the stepped part defining a longitudinally extending ridge, and a portion of the ridge corresponding to the concave, longitudinally central portion of the fθ lens being concavo-convex in a direction perpendicular to the main scanning direction.

2. The light scanning device according to claim 1, wherein:
    the fθ lens is secured to the top surface of the bottom plate, the fθ lens being secured with adhesive at a plurality of portions of the fθ lens in a longitudinal direction of the fθ lens.

3. The light scanning device according to claim 1, wherein:
    an attachment hole is formed in a bottom surface of the stepped part, the hole configured to allow removal therefrom/attachment thereinto of a light detector for detecting whether light beams having passed through the fθ lens have passed a predetermined position in the main-scanning direction and a predetermined position in a sub-scanning direction.

4. The light scanning device according to claim 3, wherein the attachment hole is formed in an area of the stepped part corresponding to the longitudinally central portion of the fθ lens.

5. An image forming apparatus, comprising the light scanning device according to claim 1.

* * * * *